US012198384B2

(12) United States Patent
Nakamura

(10) Patent No.: US 12,198,384 B2
(45) Date of Patent: Jan. 14, 2025

(54) ESTIMATION DEVICE, ESTIMATION METHOD, AND COMPUTER PROGRAM PRODUCT

(71) Applicant: Kabushiki Kaisha Toshiba, Tokyo (JP)

(72) Inventor: Misato Nakamura, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 42 days.

(21) Appl. No.: 18/181,101

(22) Filed: Mar. 9, 2023

(65) Prior Publication Data

US 2024/0037789 A1 Feb. 1, 2024

(30) Foreign Application Priority Data

Jul. 28, 2022 (JP) .................................. 2022-120572

(51) Int. Cl.
*G06T 7/80* (2017.01)
*G06T 7/246* (2017.01)
(Continued)

(52) U.S. Cl.
CPC ................ *G06T 7/80* (2017.01); *G06T 7/248* (2017.01); *G06T 7/74* (2017.01); *H04N 23/695* (2023.01);
(Continued)

(58) Field of Classification Search
CPC .. G06T 7/80; G06T 7/248; G06T 7/74; G06T 2207/10032; G06T 2207/30244;
(Continued)

(56) References Cited

U.S. PATENT DOCUMENTS 11,568,637 B2 * 1/2023 Zhou ........................ G06N 3/08
2012/0308114 A1 * 12/2012 Othmezouri ............ G06T 7/285
382/154

(Continued)

FOREIGN PATENT DOCUMENTS

CN 109887087 A * 6/2019 ............. G06T 7/579
CN 111402429 A * 7/2020
(Continued)

OTHER PUBLICATIONS

Raul Mur-Artal et al., "ORB-SLAM: a Versatile and Accurate Monocular SLAM System," IEEE Trans. on Robotics, 18 pages, URL: https;//arxiv.org/abc/1502.00956 (2015).

*Primary Examiner* — Michael Lee
(74) *Attorney, Agent, or Firm* — Finnegan, Henderson, Farabow, Garrett & Dunner, LLP

(57) ABSTRACT

According to one embodiment, an estimation device includes an estimation unit, a control unit, and a SLAM unit. The estimation unit estimates whether motion of a moving object is pure rotation from a plurality of first monocular images acquired by a monocular camera mounted on the moving object. The control unit determines the translation amount for translating the monocular camera in a case in which the motion of the moving object is pure rotation. The SLAM unit estimates at least one of a location or an orientation of the monocular camera, and three-dimensional points of a subject of the monocular camera by monocular simultaneous localization and mapping (SLAM), from the first monocular images and a second monocular image acquired by the monocular camera that is translated based on the translation amount.

9 Claims, 14 Drawing Sheets

(51) Int. Cl.
*G06T 7/73* (2017.01)
*H04N 23/695* (2023.01)

(52) U.S. Cl.
CPC .............. *G06T 2207/10032* (2013.01); *G06T 2207/30244* (2013.01)

(58) Field of Classification Search
CPC ........... G06T 7/246; G06T 7/579; G06T 7/73; H04N 23/695; G01C 11/02; G01C 11/04; G01C 21/005; G01C 21/1656
See application file for complete search history.

(56) References Cited

U.S. PATENT DOCUMENTS

| | | | |
|---|---|---|---|
| 2014/0104771 A1* | 4/2014 | Colan | G08C 17/02 |
| | | | 361/679.4 |
| 2014/0320593 A1 | 10/2014 | Pirchheim et al. | |
| 2015/0125045 A1* | 5/2015 | Gauglitz | G06T 7/246 |
| | | | 382/107 |
| 2015/0262029 A1* | 9/2015 | Pirchheim | G06T 7/70 |
| | | | 382/103 |
| 2022/0319041 A1* | 10/2022 | Jiang | G02B 27/017 |

FOREIGN PATENT DOCUMENTS

| | | | | |
|---|---|---|---|---|
| CN | 111862148 A | * | 10/2020 | ............. G06F 18/22 |
| CN | 111882589 A | * | 11/2020 | |
| CN | 112132754 B | * | 6/2021 | ............. G06T 17/00 |
| JP | 2016-526313 A | | 9/2016 | |
| JP | 2017-518547 A | | 7/2017 | |
| WO | WO 2015/138822 A1 | | 9/2015 | |

* cited by examiner

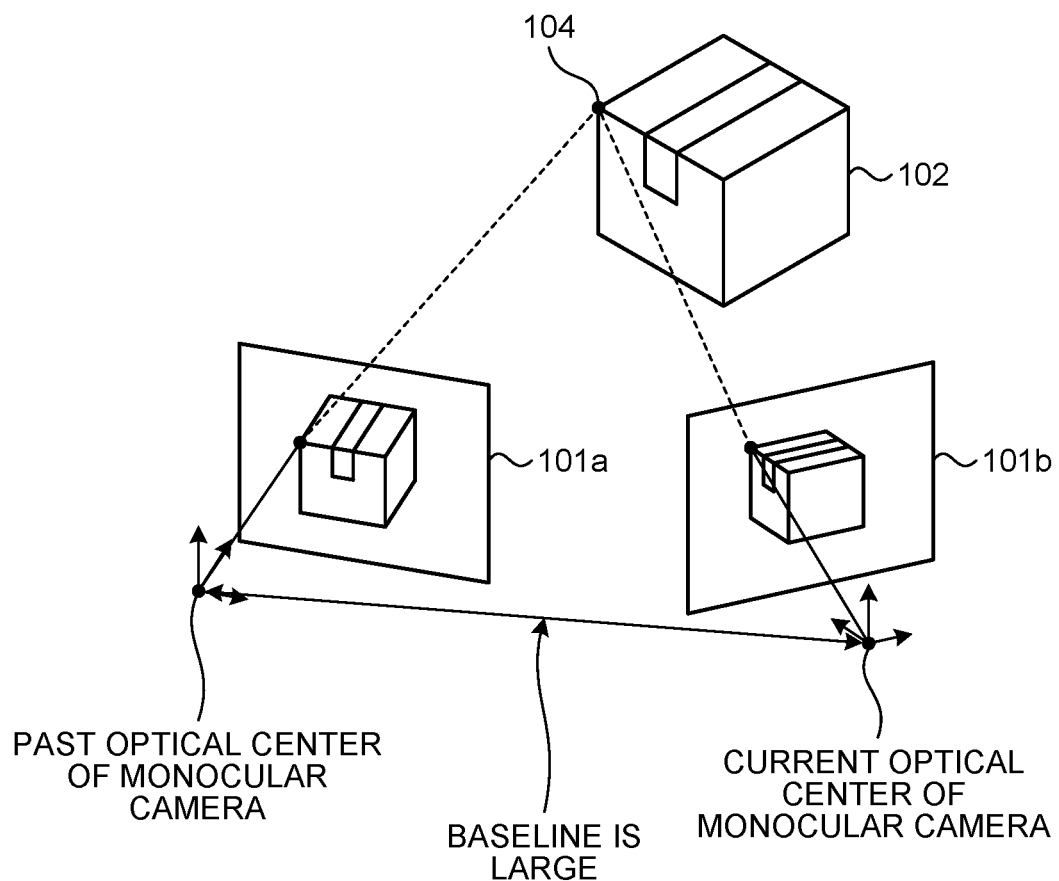

106

ESTIMATION DEVICE, ESTIMATION METHOD, AND COMPUTER PROGRAM PRODUCT

CROSS-REFERENCE TO RELATED APPLICATIONS

This application is based upon and claims the benefit of priority from Japanese Patent Application No. 2022-120572, filed on Jul. 28, 2022; the entire contents of which are incorporated herein by reference.

FIELD

Embodiments described herein relate generally to an estimation device, an estimation method, and a computer program product.

BACKGROUND

Technologies for estimating the motion of moving objects, such as autonomous mobile robots like drones, have been known conventionally. For example, motion estimation is one of the key issues in autonomous mobile robots. In a case in which a monocular camera is used for motion estimation, the monocular simultaneous localization and mapping (SLAM) technology for simultaneously estimating self-location (location and orientation) and three-dimensional points is generally used.

However, in the related art, it has been difficult to improve the accuracy of motion estimation of moving objects, such as autonomous mobile robots like drones, by using monocular SLAM.

BRIEF DESCRIPTION OF THE DRAWINGS

FIG. 5A is a diagram illustrating the first example in which the three-dimensional points can be estimated;

DETAILED DESCRIPTION

An estimation device according to an embodiment includes one or more hardware processors configured to function as an estimation unit, a control unit, and a simultaneous localization and mapping (SLAM). The estimation unit estimates whether motion of a moving object is pure rotation from a plurality of first monocular images acquired by a monocular camera mounted on the moving object. The control unit determines a translation amount for translating the monocular camera in a case in which the motion of the moving object is the pure rotation. The SLAM unit estimates at least one of a location or an orientation of the monocular camera, and three-dimensional points of a subject of the monocular camera by monocular SLAM, from the first monocular images and a second monocular image acquired by the monocular camera that is translated based on the translation amount.

Exemplary embodiments of an estimation device, an estimation method, and a computer program product will be explained below in detail with reference to the accompanying drawings. The embodiments herein are not limited to the following embodiments.

First Embodiment

A first embodiment will be described with an example of an estimation device mounted in an autonomous mobile robot as follows as an example of a moving object.

A destination is given to the autonomous mobile robot, and the autonomous mobile robot then moves to the destination.

Routes along which the autonomous mobile robot travels are changed during the travel, depending on obstacle conditions.

An example of the autonomous mobile robot is a drone. An example of a drone having a destination and moving thereto is illustrated in FIG. 1.

Figure 1:
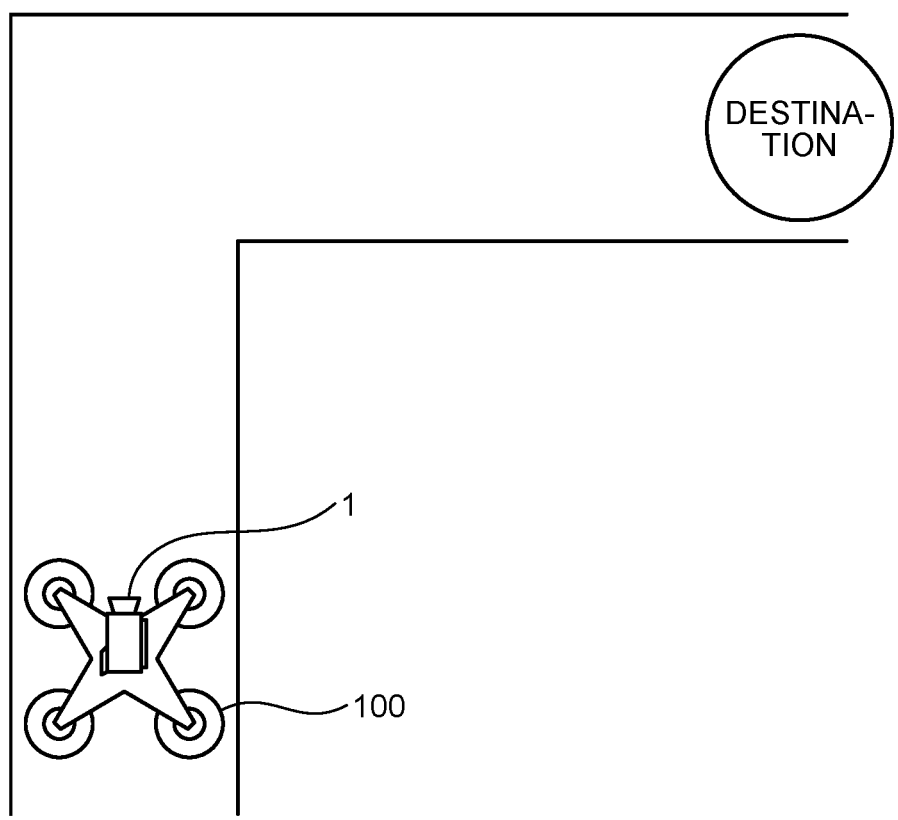
FIG. 1 is an overhead view of an autonomous mobile robot of a first embodiment and an example of movement to a destination.

FIG. 1 is an overhead view of an autonomous mobile robot 100 of the first embodiment and an example of movement to the destination. The example in FIG. 1 illustrates a case in which the autonomous mobile robot 100 is a drone equipped with a monocular camera 1. The example in FIG. 1 illustrates a case in which a path to the given destination is a narrow space surrounded by right and left walls disposed to face each other.

It is described in the first embodiment that motion estimation is carried out by using monocular SLAM. The monocular SLAM is a technique that estimates a self-location and three-dimensional points in the surrounding environment based on locations of the same objects (for example, corners of a subject in a three-dimensional space) in an image. As an example, a case in which two frames are used for motion estimation is illustrated in FIG. 2.

Figure 2:
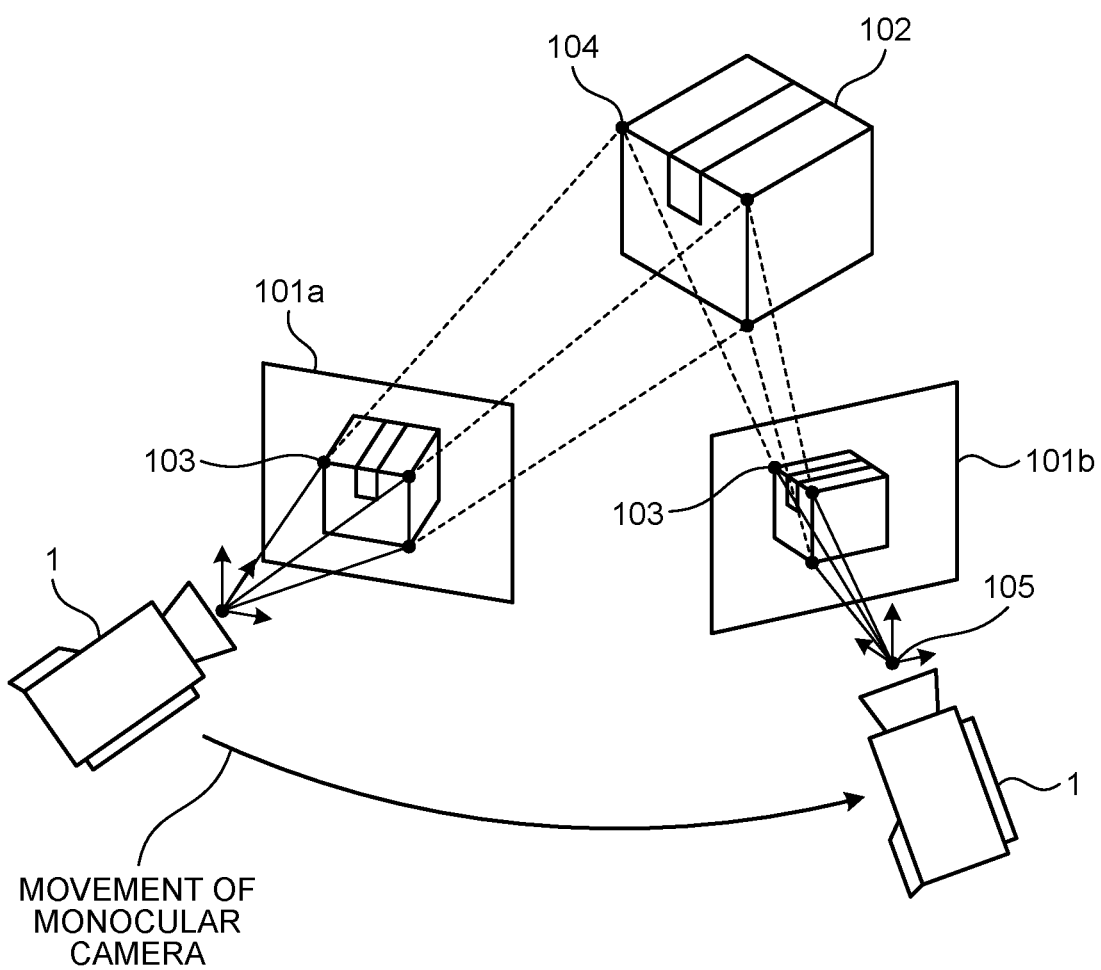
FIG. 2 is a diagram illustrating an example of estimation processing of three-dimensional points by using monocular SLAM.

FIG. 2 is a diagram illustrating an example of estimation processing of three-dimensional points 104 by using the monocular SLAM. In FIG. 2, corners of a subject 102 are detected in an image of a past frame 101a and an image of a current frame 101b by using, for example, Shi-Tomasi corner detection. The subject 102 may be any subject. In the present embodiment, locations in the image to be a feature, such as the corners of the subject 102, are referred to as feature points 103.

After the feature points 103 are detected, a pair of the feature points similar between one feature point 103 in the past frame 101a and the other feature point 103 in the current frame 101b is detected. In the pair of feature points, these feature points are assumed to have a correspondence relationship. The monocular SLAM is used to estimate the three-dimensional points 104 based on the correspondence relationship between the pair of feature points. A self-location 105 of the monocular camera 1 is estimated based on the estimated three-dimensional points 104 (see FIG. 8 described later for details).

In a case in which the monocular SLAM performs only rotational motion (referred to as "pure rotation" in the present embodiment), a problem occurs. First, optical flows will be described.

Figure 3:
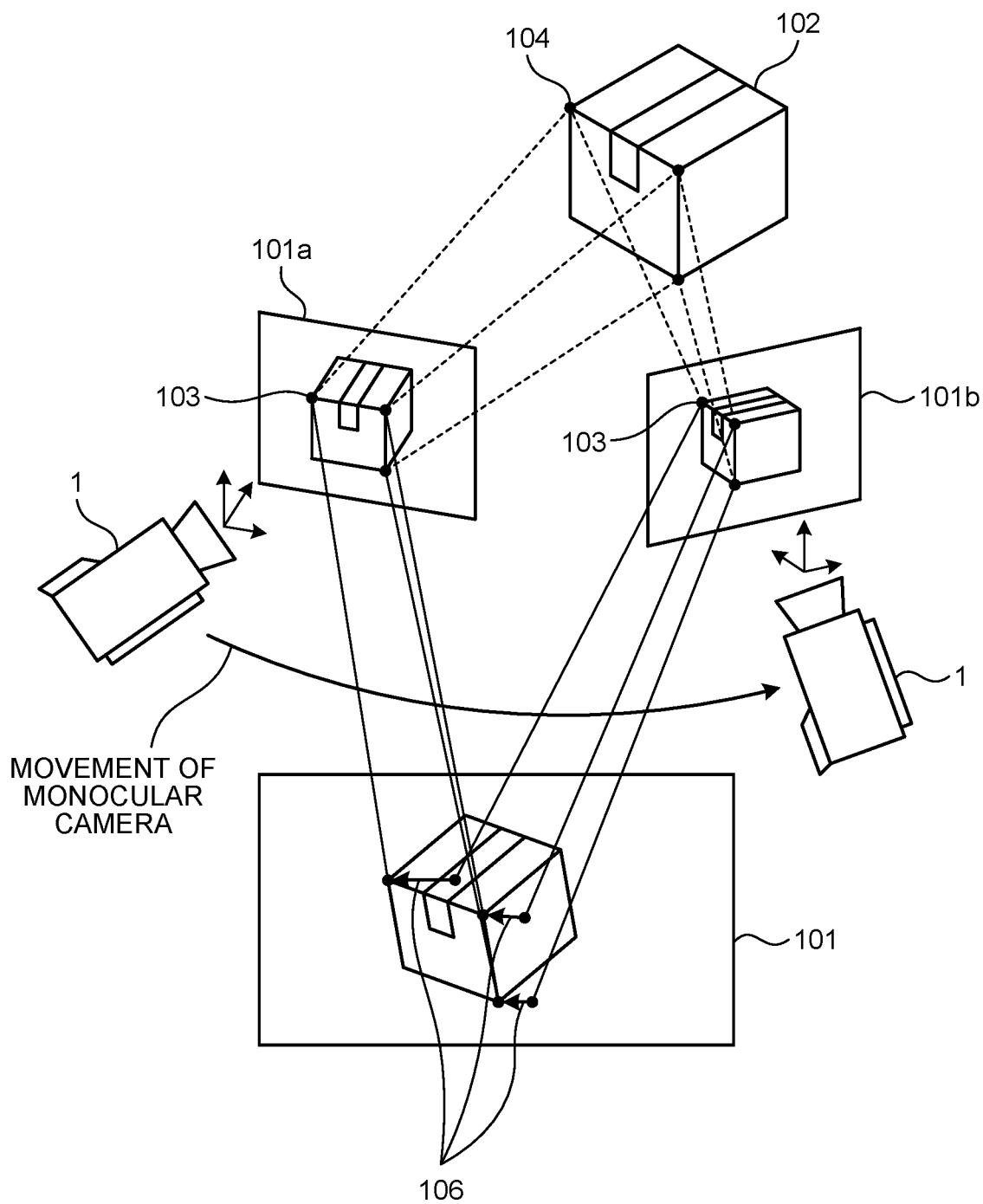
FIG. 3 is a diagram illustrating an example of optical flows.

FIG. 3 is a diagram illustrating an example of optical flows 106. The optical flows 106 represent vectors each of which indicates the movement of the feature points 103 that have a correspondence relationship in the frames 101. The optical flows 106 are used to estimate the self-location 105 of the monocular camera 1.

Figure 4A:
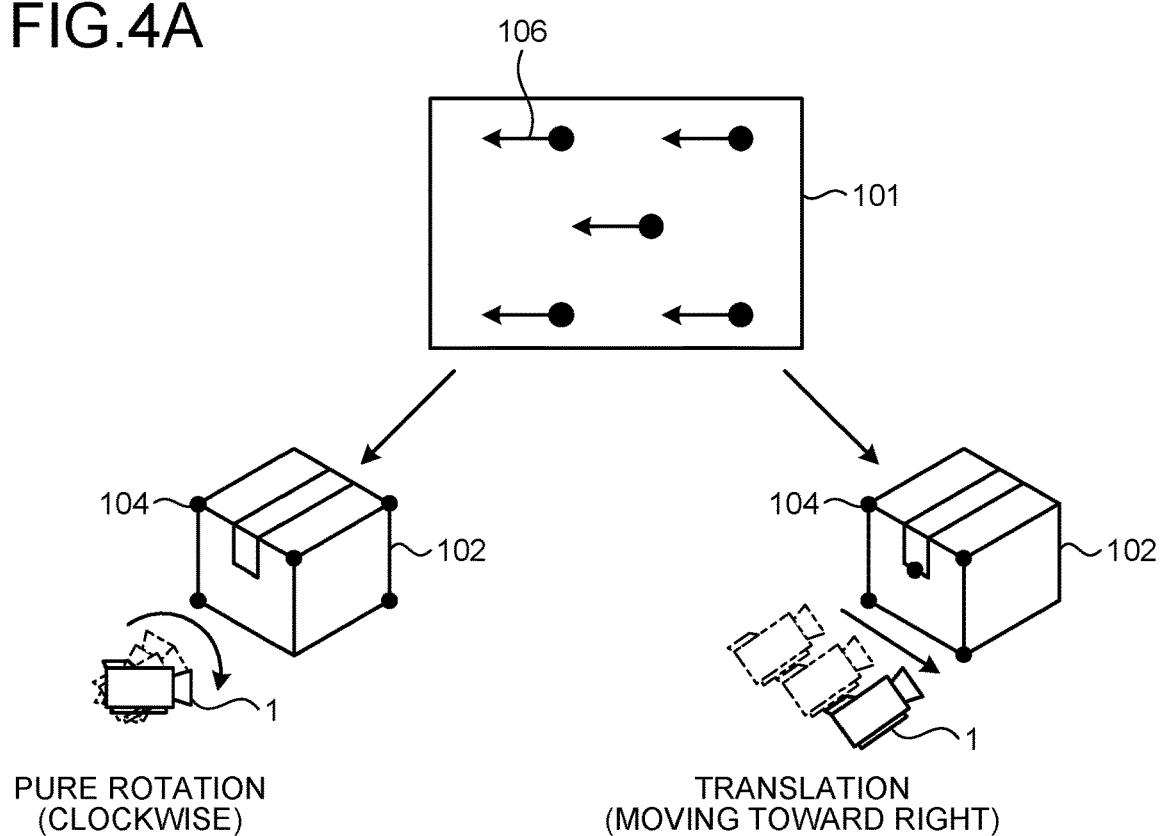
FIG. 4A is a diagram illustrating a first example in which a distinction between pure rotation and translation is not drawn in optical flows.
Figure 4B:
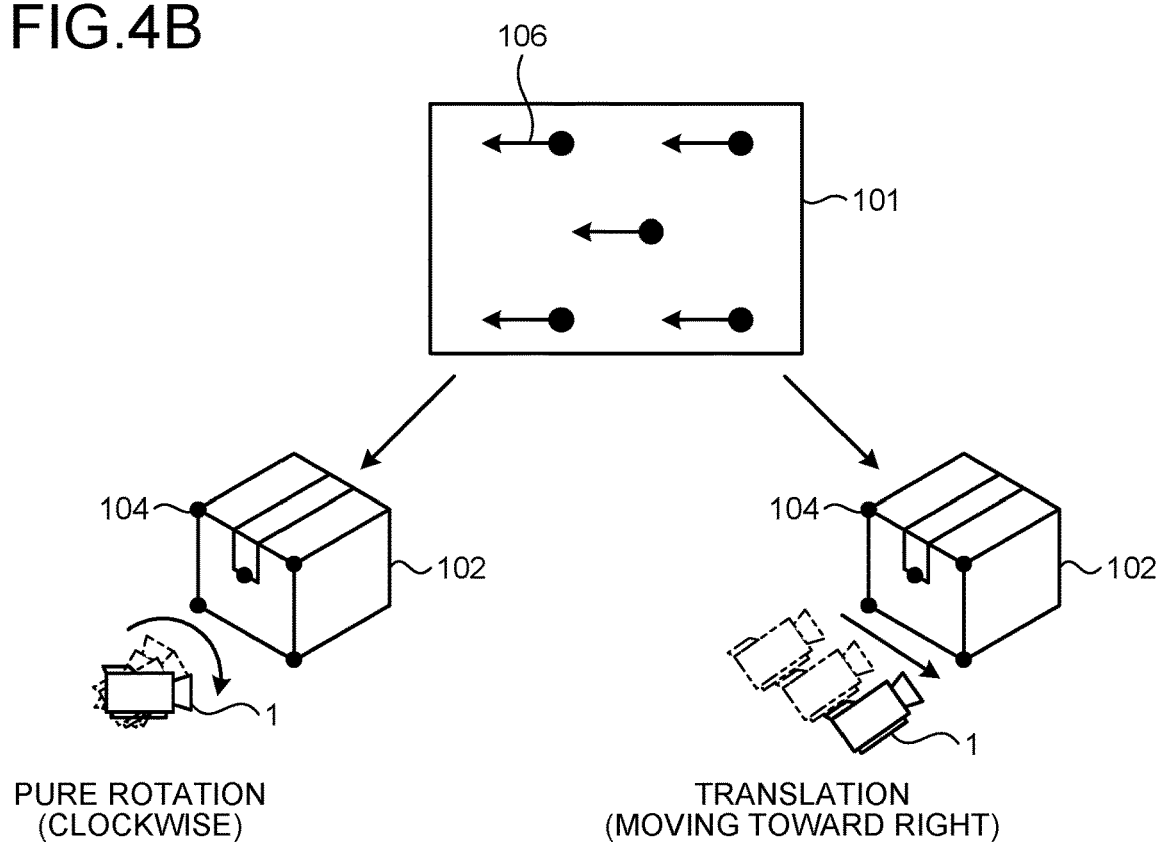
FIG. 4B is a diagram illustrating a second example in which a distinction between the pure rotation and translation is not drawn in the optical flows.

FIG. 4A is a diagram illustrating a first example in which a distinction between pure rotation and translation is not drawn in optical flows 106. FIG. 4B is a diagram illustrating a second example in which a distinction between pure rotation and translation is not drawn in the optical flows 106. First, a problem occurring at the start of motion estimation (a stage in which there are no estimated three-dimensional points 104, and the self-location 105 of the monocular camera 1 is not detected) will be described.

Motion estimation at the start of motion estimation is performed by using a 5-point algorithm or other algorithms such as a general method. In the 5-point algorithm, the motion (that is, self-location) of the monocular camera 1 at the start of motion estimation is estimated based on inputs of the five optical flows 106.

However, as illustrated in FIGS. 4A and 4B, since only the optical flows 106 are provided, a distinction between rotation and translation may not be drawn. FIGS. 4A and 4B are examples of motion estimation in a case in which the optical flows 106 have approximately the same orientations and approximately the same lengths.

It is illustrated in the example in FIG. 4A that a distinction between pure rotation (clockwise) and translation (moving toward right) is not drawn. In this case, the pure rotation is performed in a case in which distances between individual three-dimensional points 104 of the subject 102 and the monocular camera 1 are different from each other, and the translation is performed in a case in which distances between individual three-dimensional points 104 of the subject 102 and the monocular camera 1 are approximately the same as each other.

It is illustrated in the example in FIG. 4B that a distinction between the pure rotation (clockwise) and the translation (moving toward right) is not drawn. In this case, the pure rotation is performed in a case in which distances between individual three-dimensional points 104 of the subject 102 and the monocular camera 1 are the same as each other, and the translation is performed in a case in which distances between individual three-dimensional points 104 of the subject 102 and the monocular camera 1 are approximately the same as each other.

As illustrated in FIGS. 4A and 4B, it is difficult to distinguish between the case of pure rotation and the case of translational motion in which the distance between the subject 102 and the monocular camera 1 is nearly constant. In the motion estimation carried out by using the optical flows 106, estimation based on the indistinguishable optical flows 106 described above may result in incorrect estimation of both rotation and translation. Therefore, in a case in which pure rotation of the autonomous mobile robot 100 equipped with the monocular camera 1 is performed at the start of estimating motion, the accuracy of motion estimation deteriorates.

Next, a problem occurring during motion estimation continuation (a stage in which there are estimated three-dimensional points 104, and the self-location 105 of the monocular camera 1 is detected in the past frame 101a) will be described.

Figure 5B:
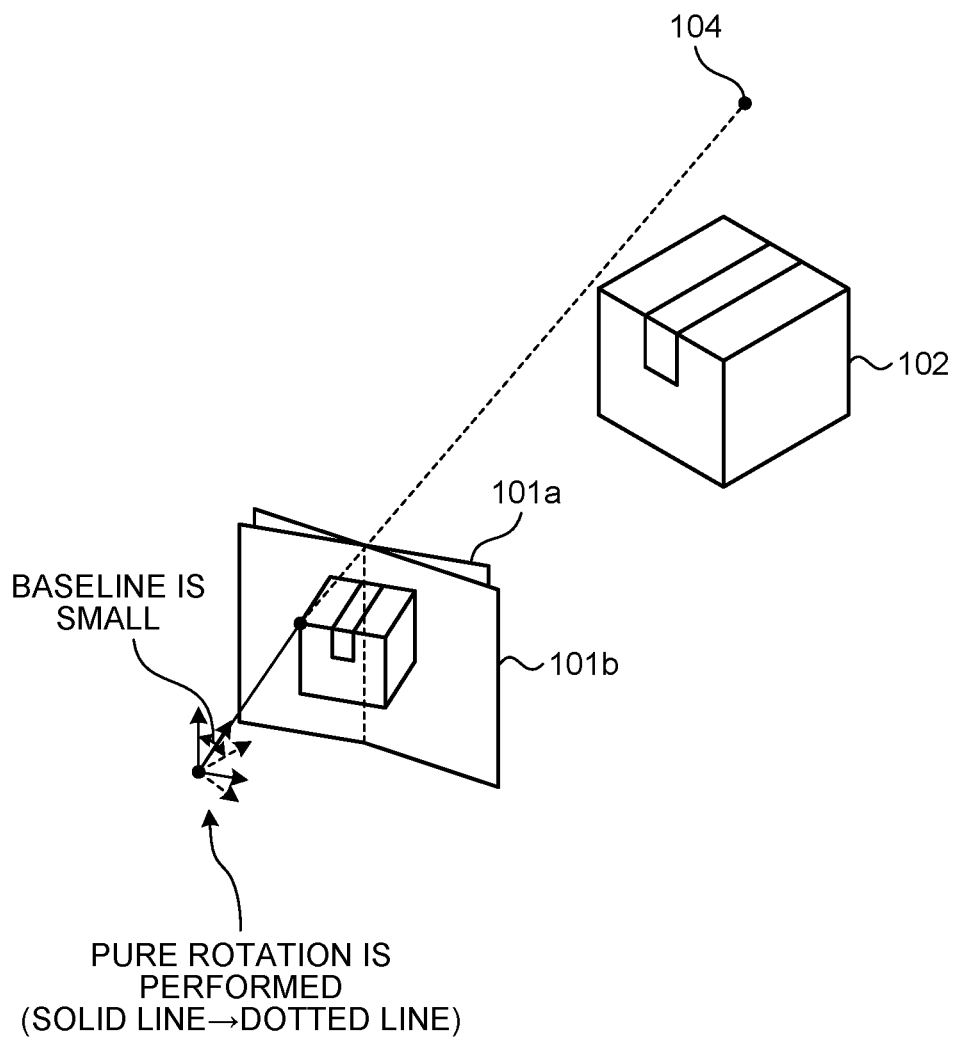
FIG. 5B is a diagram illustrating the first example in a case in which the estimation of the three-dimensional points fails.

FIG. 5A is a diagram illustrating a first example in which the three-dimensional points 104 can be estimated. FIG. 5B is a diagram illustrating the first example in a case in which the estimation of the three-dimensional points 104 fails. A location of an optical axis in each of FIGS. 5A and 5B is the actual location of an optical axis of the monocular camera 1.

A smaller baseline is obtained, as illustrated in FIG. 5B, in a case in which the monocular camera 1 performs pure rotation as compared to a case in which the monocular camera 1 moves to obtain a sufficient baseline during the motion estimation continuation (FIG. 5A). In a case in which three-dimensional locations of the three-dimensional points 104 are estimated in a situation in which the baseline is small, an incorrect depth (infinite distance) may be estimated, as illustrated in FIG. 5B.

Figure 6A:
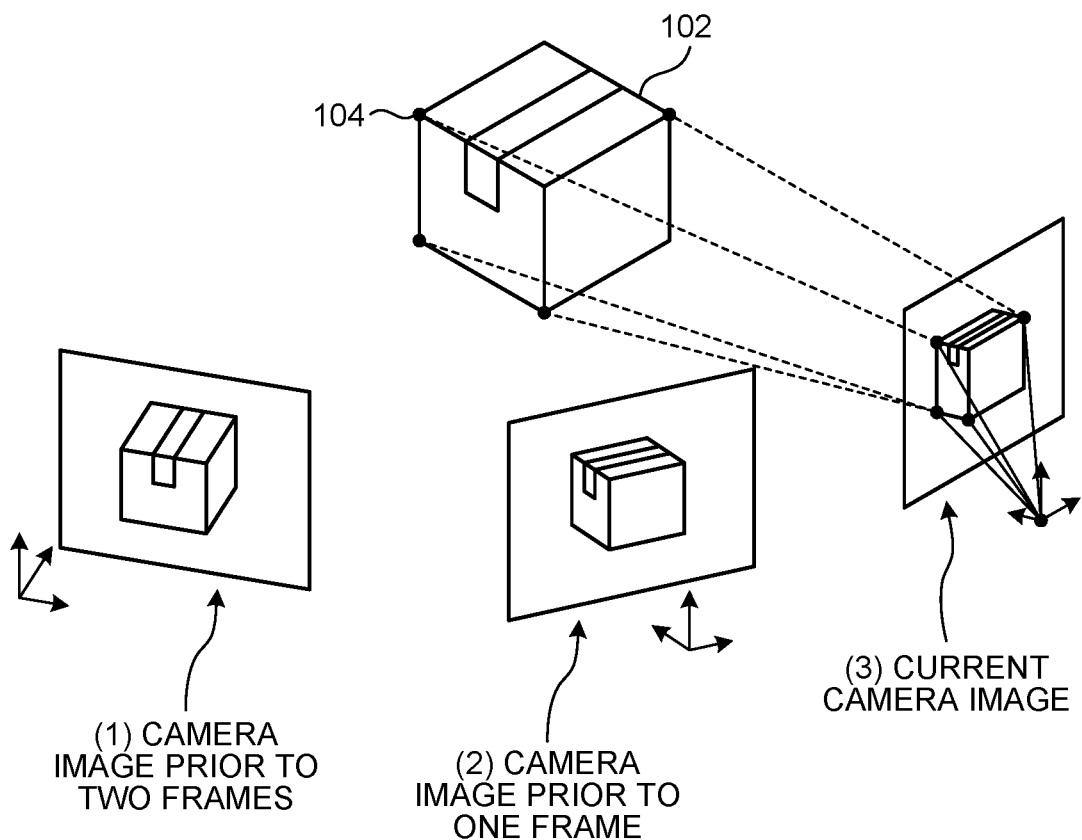
FIG. 6A is a diagram illustrating the second example in which the three-dimensional points can be estimated.
Figure 6B:
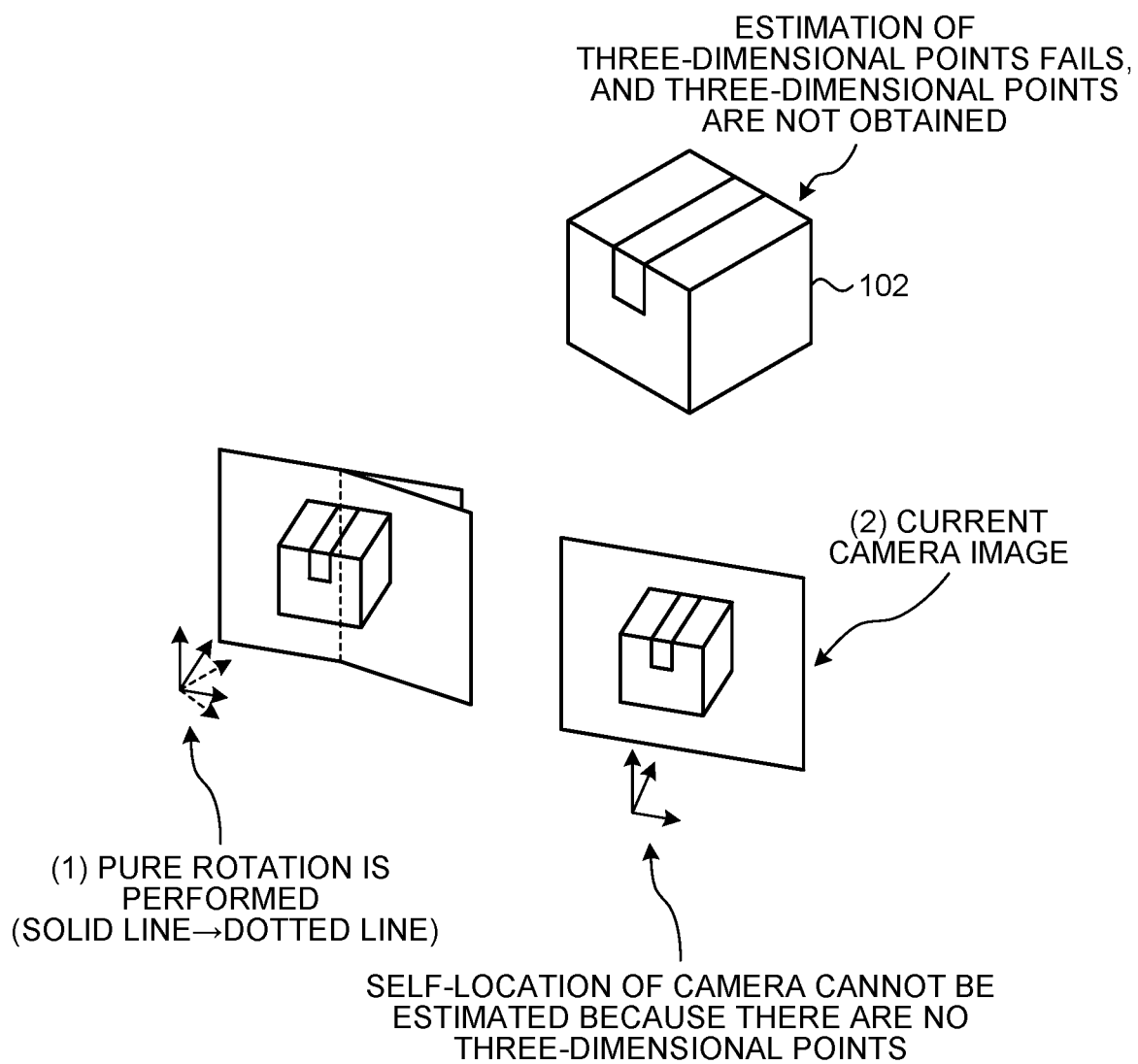
FIG. 6B is a diagram illustrating the second example in a case in which the estimation of the three-dimensional points fails.

FIG. 6A is a diagram illustrating a second example in which the three-dimensional points 104 can be estimated. FIG. 6B is a diagram illustrating the second example in a case in which the estimation of the three-dimensional points 104 fails. A location of an optical axis in each of FIGS. 6A and 6B is the actual location of an optical axis of the monocular camera 1. After pure rotation, there may be no three-dimensional points 104 estimated at the finite depth (as illustrated in FIG. 5A, three-dimensional locations of three-dimensional points estimated in a situation with a large baseline). In the motion to be estimated, specifically in translation, three-dimensional points 104 estimated at the finite depth are required, as illustrated in FIG. 6A. Thus, in a case in which there are no such three-dimensional points 104 estimated at the finite depth (FIG. 6B), the correct translational motion may not be estimated.

Figure 7:
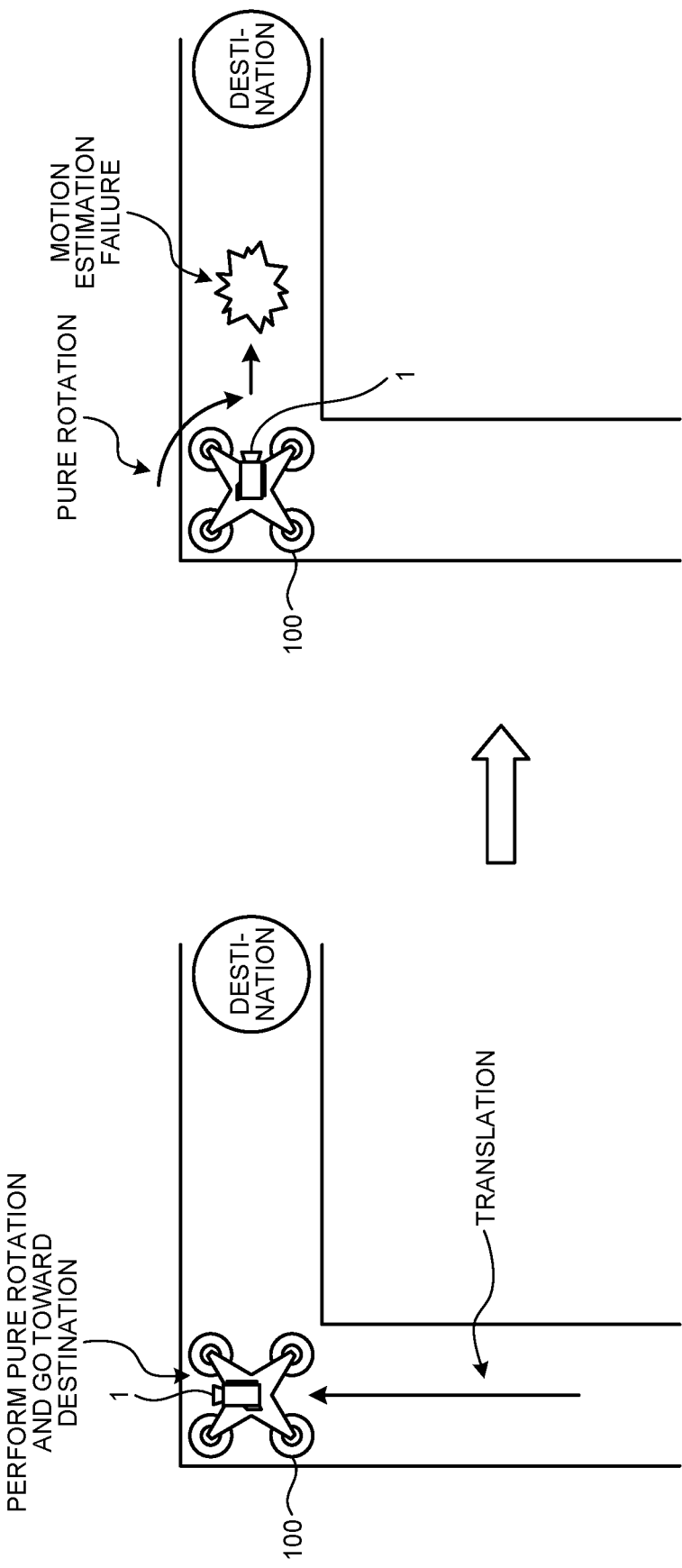
FIG. 7 is an overhead view illustrating an example of a situation requiring pure rotation.

FIG. 7 is an overhead view illustrating an example of a situation requiring pure rotation. The example in FIG. 7 illustrates a case in which the autonomous mobile robot 100 equipped with the monocular camera 1 translates to a wall in front of itself and then continues pure rotation until the autonomous mobile robot 100 rotates by 90 degrees to the right at a corner. As described above, the autonomous mobile robot 100 may perform pure rotation depending on an obstacle condition. The problem described above causes the motion estimation of the autonomous mobile robot 100 to fail after the pure rotation.

For example, in the related art, such as Publication of Japanese Translation of PCT Application No. 2016-526313, in a case in which the pure rotation is continuously performed during the motion estimation continuation (for example, a case in which the pure rotation is continuously performed to 180 degrees), most of the three-dimensional points 104 of the subject 102 become three-dimensional points 104 at the infinite distance, and the correct translational motion may not be estimated.

Here, an example of a method of estimating translation based on the three-dimensional points 104 estimated at the finite depth will be described.

Figure 8:
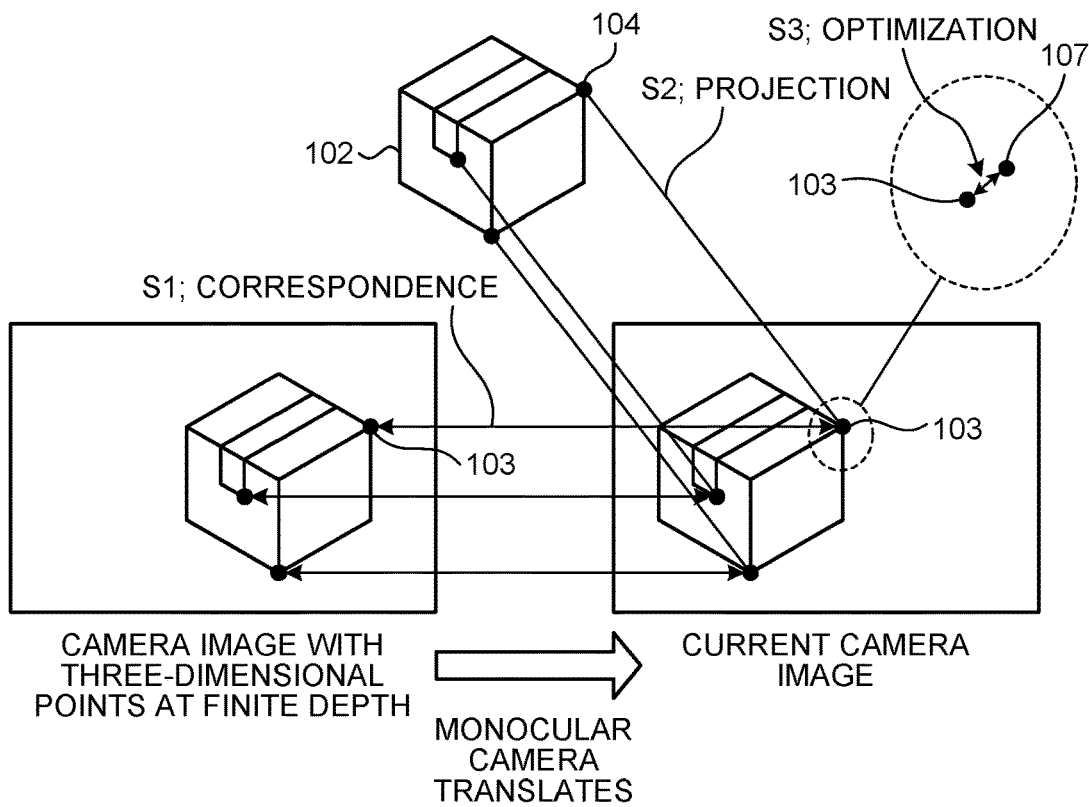
FIG. 8 is a diagram illustrating an example of a method of estimating translation based on the three-dimensional points estimated at the finite depth.

FIG. 8 is a diagram illustrating an example of a method of estimating translation based on the three-dimensional points 104 estimated at the finite depth. In a case in which three-dimensional points 104 estimated at the finite depth are obtained, the monocular SLAM is used to estimate the self-location 105 of the monocular camera 1 in real time, as illustrated in FIG. 8, for example. First, the three-dimensional points 104 are estimated at the finite depth based on the correspondence relationship between pairs of the feature points 103 (S1; correspondence). Next, the three-dimensional points 104 estimated at the finite depth are then projected as points 107 on the current camera image (S2; projection). Finally, a location and an orientation (rotation) of the monocular camera 1 are optimized so that differences between locations indicated by the projected points 107 and locations on the image, which have the correspondence relationship with the pairs of feature points 103, are minimized (S3; optimization).

Here, the three-dimensional points 104 at the finite depth is used as inputs for motion estimation to optimize translation and rotation, while the three-dimensional points 104 at the infinite distance is used as inputs for motion estimation to optimize rotation only. In a case in which there are some three-dimensional points 104 that are estimated at the finite depth out of the three-dimensional points 104 input during the optimization, the translation can be estimated by using only the three-dimensional points 104 that are estimated at the finite depth, for example. In general, as the number of the three-dimensional points 104 to be input is increased, the accuracy of the motion estimation is improved. Therefore, as the three-dimensional points 104 estimated at the finite depth is increased, the improvement in the accuracy of the estimation for translation can be expected. Conversely, as the number of the three-dimensional points 104 estimated at the finite depth used during the motion estimation is decreased, the accuracy of estimation of translation deteriorates. In a case in which there are no three-dimensional points 104 estimated at the finite depth, the translation cannot be estimated.

As described above, there are some problems in a case in which the autonomous mobile robot 100 starts and continues the motion estimation.

At Start of Motion Estimation

At the start of motion estimation, the optical flows 106 may have approximately the same orientations and approximately the same lengths. In this case, as illustrated in FIGS. 4A and 4B described above, the accuracy of the motion estimation at the start of motion estimation deteriorates because rotation and translation are not distinguished.

During Motion Estimation Continuation

In a case in which the pure rotation continues even during the motion estimation continuation (for example, the case in which the pure rotation is continuously performed to 180 degrees), most of the three-dimensional points 104 of the subject 102 may become the three-dimensional points 104 at the infinite distance. Thus, in a case in which the pure rotation continues, the accuracy of the estimation for translation deteriorates.

Hereinbelow, embodiments of an estimation device that can improve the accuracy of estimating the motion of the autonomous mobile robot 100 even in the above-described case will be described.

In order to solve the above problems, an estimation device 10 of the first embodiment causes the autonomous mobile robot 100 (monocular camera 1) to translate, in the case in which the motion of the monocular camera 1 is pure rotation, so that the sufficient baseline is obtained, thereby preventing deterioration of the accuracy of the motion estimation or failure in the motion estimation.

Here, a definition of each of the deterioration and failure in the estimation accuracy in the description according to the first embodiment will be described as follows. In addition, specific examples of the deterioration and failure in the accuracy of motion estimation will be described in the following section.

The "deterioration in estimation accuracy" is defined as a large difference (greater than a given threshold value) between an estimated result and a true value. The "failure in estimation" is defined as the inability to perform estimation because there is no data to be used in the motion estimation performed by the estimation device 10.

Specific Examples of "Deterioration in Motion Estimation Accuracy"

At the start of motion estimation, a distinction between rotation and translation may not be drawn by using the optical flows 106 alone, and deterioration in the accuracy of estimating both rotation and translation occurs.

As the pure rotation continues, the accuracy of estimating translation deteriorates because the number of three-dimensional points 104 estimated at the finite depth out of the three-dimensional points 104 input during the optimization is decreased.

Specific Examples of "Failure in Motion Estimation"

In a case in which there is no input for the estimated three-dimensional points 104 at the time of motion estimation (both the three-dimensional points 104 at the finite depth and the three-dimensional points 104 at the infinite distance are not available as input for the motion estimation), both rotation and translation cannot be estimated.

In a case in which there is no input of the three-dimensional points 104 estimated at the finite depth at the time of motion estimation, translation cannot be estimated.

The features of the first embodiment of the estimation device 10 are as follows.

The autonomous mobile robot 100 (monocular camera 1) is translated during the pure rotation.

The amount of translating (baseline) the autonomous mobile robot 100 (monocular camera 1) is varied according to a distance to the subject 102. The farther the distance to the subject 102, the smaller the variation in visibility (parallax). Since the monocular SLAM obtains information on a distance between the subject 102 and the monocular camera 1 based on the variation in visibility, the accuracy of the motion estimation decreases as the variation in visibility is small.

The pure rotation is detected from the optical flows 106. Specifically, the following criteria will be used for determination. In a case in which there are any variations in lengths of the optical flows 106, it is determined that translation is performed. In a case in which there are no variations in the lengths of the optical flows 106, it is determined that pure rotation is performed.

Hereinbelow, an example of a functional configuration of the estimation device 10 of the first embodiment will be described in details. The estimation device 10 of the first embodiment estimates the self-location 105 (location and orientation) of the autonomous mobile robot 100 and the three-dimensional points 104 of the subject 102 based on monocular images which the monocular camera 1 inputs in real time.

Example of Functional Configuration

Figure 9:
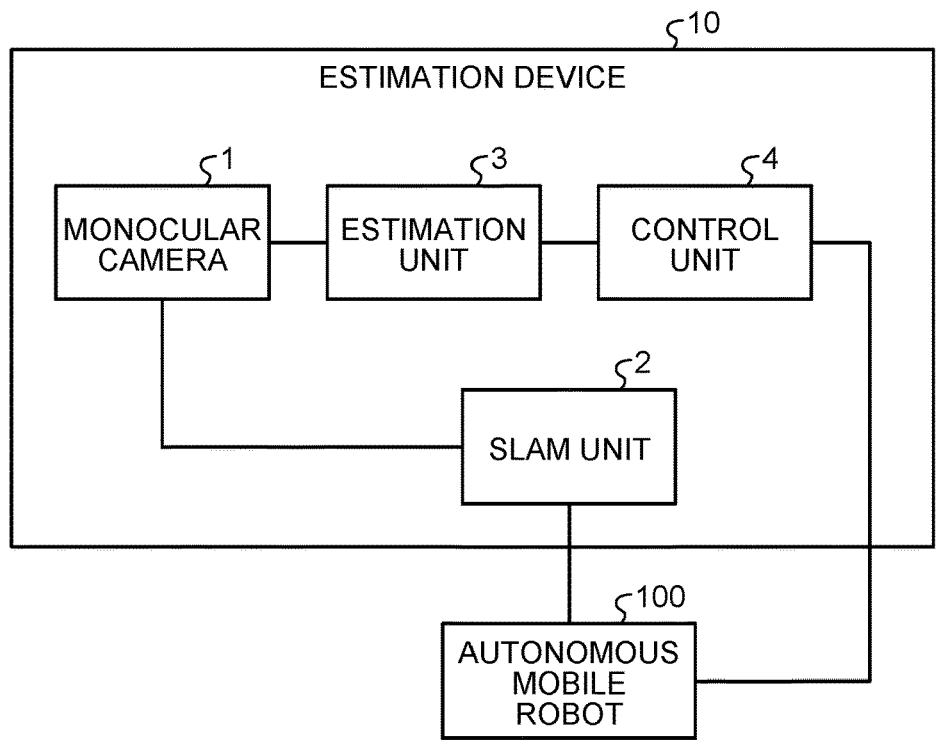
FIG. 9 is a diagram illustrating an example of a functional configuration of an estimation device of the first embodiment.

FIG. 9 is a diagram illustrating an example of a functional configuration of the estimation device 10 of the first embodiment. The estimation device 10 of the first embodiment is connected to the autonomous mobile robot 100. The estimation device 10 is mounted in the autonomous mobile robot 100. The estimation device 10 may be a server device including components (a SLAM unit 2, an estimation unit 3, and a control unit 4) in addition to the monocular camera 1, and the server device may be remotely connected to the autonomous mobile robot 100 via a wireless network or other means.

The estimation device 10 of the first embodiment is provided with the monocular camera 1, the SLAM unit 2, the estimation unit 3, and the control unit 4.

The monocular camera 1 is mounted on the autonomous mobile robot 100 and acquires monocular images in real time. The autonomous mobile robot 100 is, for example, a drone. The autonomous mobile robot 100 is a robot that can move to a given destination. A path along which the autonomous mobile robot moves can be changed while the autonomous mobile robot travels, depending on an obstacle condition estimated by the SLAM unit 2.

The SLAM unit 2 estimates the self-location 105 of the monocular camera 1 (autonomous mobile robot 100) and the three-dimensional points 104 of the subject 102 from monocular images acquired by the monocular camera 1, by using the SLAM technology. For example, Non-Patent Document 1 and parallel tracking and mapping (PTAM) can be used as the SLAM technology. PTAM is monocular SLAM that estimates a camera pose from a correspondence relationship between feature points.

The estimation unit 3 estimates whether the motion of the autonomous mobile robot 100 is pure rotation from the optical flows 106 indicating movement of the feature points of the subject 102. For example, in a case in which the lengths of the optical flows vary (that is, the variations in the lengths are equal to or greater than a threshold value), the estimation unit 3 estimates that the autonomous mobile robot 100 performs translation. In addition, for example, in a case in which the lengths of the optical flows do not vary (that is, the variations in the lengths are smaller than the threshold value), the estimation unit 3 estimates that the autonomous mobile robot 100 performs pure rotation.

However, as illustrated in FIGS. 4A and 4B described above, a distinction between translation and rotation may not be drawn in a case in which the optical flows 106 have approximately the same orientations and approximately the same lengths. In such a case, there is no problem even though the estimation unit 3 of the first embodiment estimates that the autonomous mobile robot 100 performs the pure rotation. This is because the number of new three-dimensional points 104 only increases even though the monocular camera 1 is moved to obtain the baseline by the translation of the autonomous mobile robot 100 (monocular camera 1) in a case in which the pure rotation is estimated. Therefore, the estimation unit 3 of the first embodiment estimates that the autonomous mobile robot 100 performs the pure rotation in the case in which there are no variations in the lengths of the optical flows 106.

The control unit 4 causes the autonomous mobile robot 100 in which the monocular camera 1 is mounted to translate. For example, in the example in FIG. 1, a translation direction is vertical up and down because the horizontal left and right direction is close to the wall. The amount of translating (translation amount) the autonomous mobile robot 100 is determined by the control unit 4.

For example, the control unit 4 determines the amount b (baseline) of translating the monocular camera 1 by the following Equations (1) and (2).

At Start of Motion Estimation $$b = \text{upper limit of movable region} \quad (1)$$

During Motion Estimation Continuation $$b = F(d) \quad (2)$$

In a case in which F(d) is greater than the movable region, b is set to the upper limit of the movable region.

Here, d is a distance between the monocular camera 1 and the subject 102, and F is a function for determining the amount of translating the monocular camera 1.

In other words, the control unit 4 determines the upper limit of the movable region of the monocular camera 1 at the start of estimating motion, and determines the translation amount b to be within a range equal to or smaller than the upper limit according to the distance between the monocular camera 1 and the subject 102 during the motion estimation continuation.

In order to cause the monocular camera 1 to translate, the control unit 4 causes the autonomous mobile robot 100 to translate in a given direction, thereby translating the monocular camera 1. At the start of estimating motion, the control unit 4 determines, based on the upper limit of the movable region of the monocular camera 1, a direction, for which the upper limit is greater, as the given direction. For example, the movable region is the height from the ground to the ceiling in the example in FIG. 1.

For example, in a case in which the autonomous mobile robot 100 or the estimation device 10 is provided with an ultrasonic sensor, the distance d may be a statistic (for example, mean or median) of the depths of the three-dimensional points 104 acquired by the ultrasonic sensor. For example, the distance d may also be a statistic of depths of an object of interest, such as a particular pedestrian or an oncoming vehicle. Detection of the object of interest can be achieved by the estimation unit 3 using a neural network obtained by a machine learning method such as a convolutional neural network (CNN), for example.

The larger the distance d, the smaller the variation in visibility. Therefore, the accuracy of motion estimation may not be obtained in a case in which the autonomous mobile robot 100 equipped with the monocular camera 1 is not significantly translated. Therefore, the larger the distance d, the greater the translation of the autonomous mobile robot 100 equipped with the monocular camera 1. That is, F is a function such that the larger the distance d, the larger b=F(d).

Here, the reason why the larger the distance d, the smaller the variation in visibility, in the case in which the autonomous mobile robot 100 equipped with the monocular camera 1 is not significantly translated is described. In a case in which a focal length (constant) of the monocular camera 1 is denoted by f, and the variation in visibility (parallax) is denoted by s, d, b, s, and f have the following relationship.

$$d = b \times (f/s) \quad (3)$$

The following Equation (4) is obtained by modifying Equation (3).

$$s = f \times (b/d) \quad (4)$$

Therefore, according to Equation (4), unless the autonomous mobile robot 100 equipped with the monocular camera 1 is significantly translated so that the larger the distance d, the greater the translation amount (baseline) b, the parallax s, that is the variation in visibility may be small.

Next, an example of simulation results of the optical flows 106 in a case in which the autonomous mobile robot 100 (monocular camera 1) performs translational motion and an example of simulation results of the optical flows 106 generated in a case in which the autonomous mobile robot 100 performs pure rotational motion will be described.

Figure 10A:
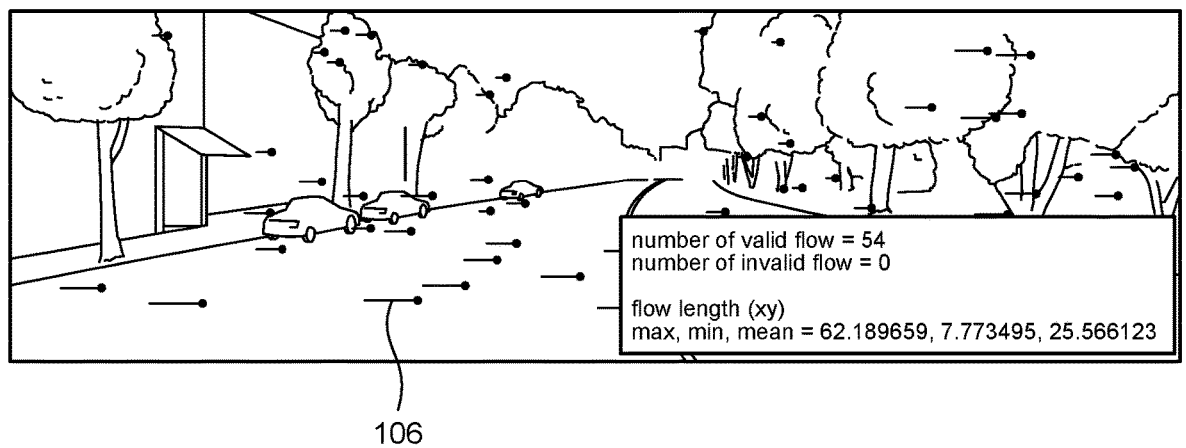
FIG. 10A is a diagram illustrating an example of optical flows in a case in which a monocular camera has been translated by 40 centimeters in the horizontal lateral direction.
Figure 10B:
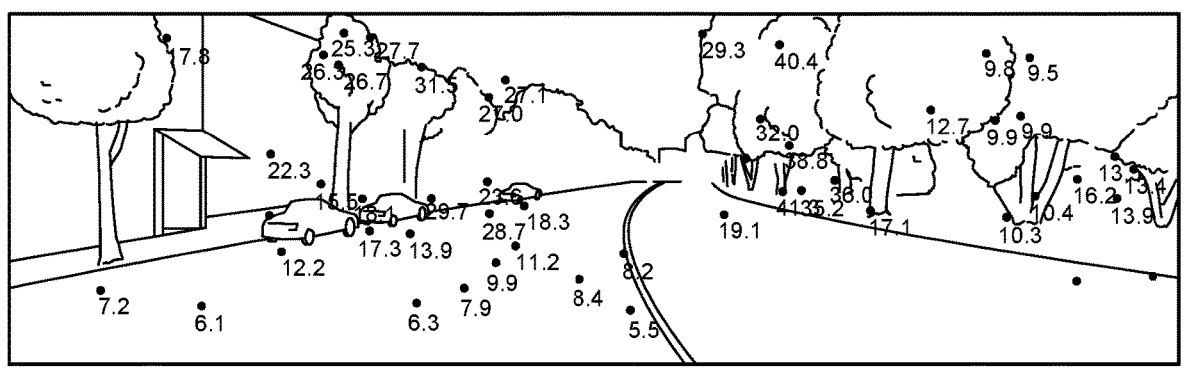
FIG. 10B is a diagram illustrating an example of depths of three-dimensional points in a case in which the monocular camera has been translated by 40 centimeters in the horizontal lateral direction.

FIG. 10A is a diagram illustrating an example of optical flows 106 in a case in which the monocular camera 1 has been translated by 40 centimeters in the horizontal lateral direction. FIG. 10B is a diagram illustrating an example of depths of three-dimensional points 104 in a case in which the monocular camera 1 has been translated by 40 centimeters in the horizontal lateral direction.

Figure 11A:
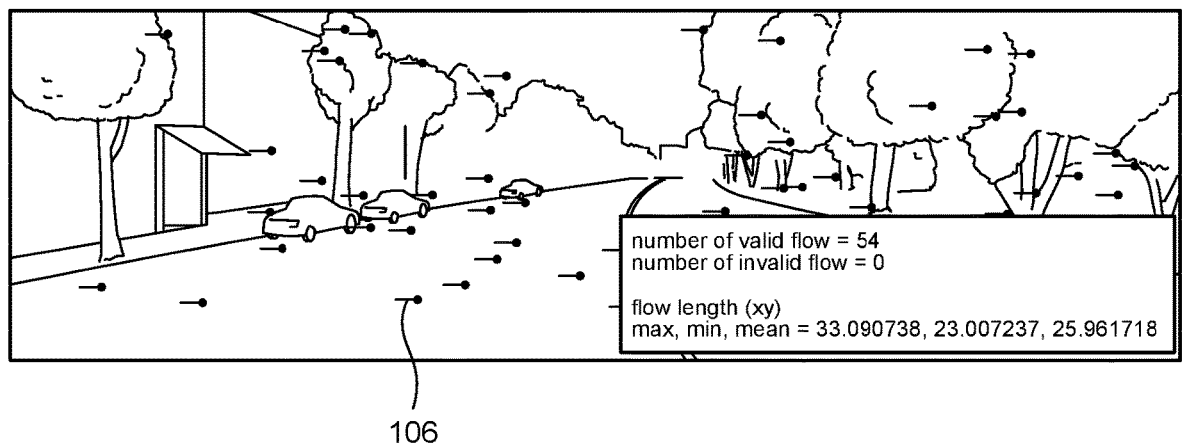
FIG. 11A is a diagram illustrating an example of optical flows in a case in which the monocular camera performs pure rotation by 1.5 degrees in yaw only.
Figure 11B:
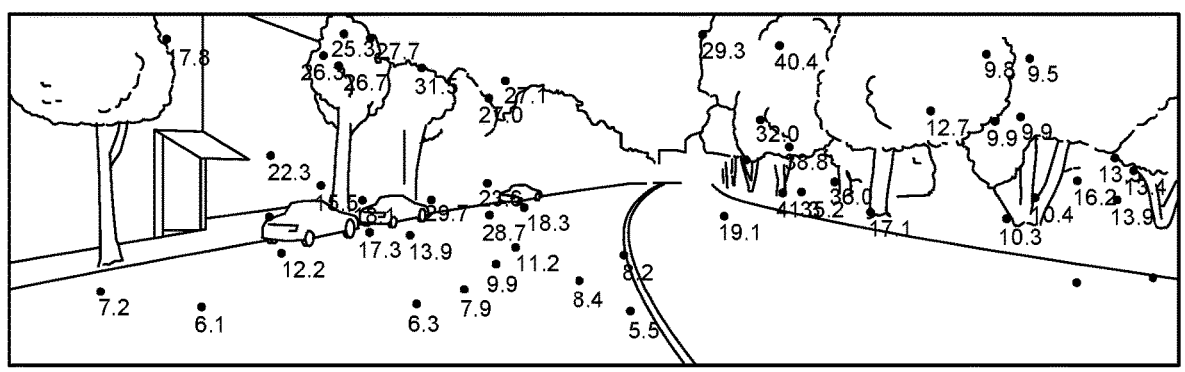
FIG. 11B is a diagram illustrating an example of depths of three-dimensional points in a case in which the monocular camera performs pure rotation by 1.5 degrees in yaw only.

FIG. 11A is a diagram illustrating an example of optical flows 106 in a case in which the monocular camera 1 performs pure rotation by 1.5 degrees in yaw only. FIG. 11B is a diagram illustrating an example of depths of three-dimensional points 104 in a case in which the monocular camera 1 performs pure rotation by 1.5 degrees in yaw only.

"number of valid flow" in FIGS. 10A and 11A is the number of samples of the optical flows 106. "flow length" is a statistic (maximum, minimum, and mean) of the lengths of the optical flows 106. A difference between maximum, minimum, and mean of "flow length" in FIG. 11A is smaller than a difference between maximum, minimum, and mean of "flow length" in FIG. 10A.

The difference between minimum, maximum, and mean means that there are variations in the optical flows 106. Here, the variation means that lengths of vectors of the optical flows 106 vary in depth (front and rear in depth direction) in the image. For example, the estimation unit 3 calculates a variance value of the "flow length" of the optical flows 106 and determines the magnitude of variation by using the variance value and a threshold value set in advance to an appropriate value according to an operating environment of the autonomous mobile robot 100.

Specifically, for example, in a case in which the variance value of the "flow length" is equal to or greater than a threshold value, the estimation unit 3 determines that the variation is large (estimated as translation). Furthermore, in a case in which the variance value of the "flow length" is smaller than the threshold value, the estimation unit 3 determines that the variation is small (estimated as pure rotation).

The estimation device 10 may be provided with a plurality of the monocular cameras 1. For example, in a case in which the monocular cameras 1 with different performance are provided, monocular images imaged by any monocular camera 1 may be used for the estimation processing.

Example of Estimation Method

Figure 12:
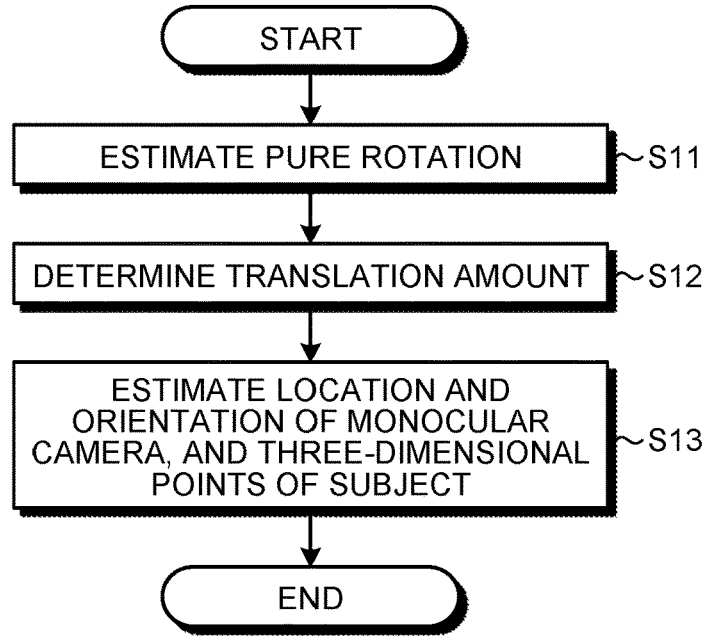
FIG. 12 is a flowchart illustrating an example of an estimation method of the first embodiment.

FIG. 12 is a flowchart illustrating an example of an estimation method of the first embodiment. The example in FIG. 12 describes the flowchart illustrating the case in which the motion of the autonomous mobile robot 100 has been estimated as pure rotation.

First, the estimation unit 3 estimates that the motion of the autonomous mobile robot 100 is pure rotation from a plurality of first monocular images acquired by the monocular camera 1 mounted on the autonomous mobile robot 100 (an example of a moving object) (step S11).

Next, in a case in which the motion of the autonomous mobile robot 100 has been estimated as the pure rotation by processing at step S11, the control unit 4 determines the translation amount to translate the monocular camera 1 (step S12).

Next, the SLAM unit 2 estimates, from the first monocular images and a second monocular image acquired by the monocular camera 1 that has been translated based on the translation amount determined by the processing at step S12, a location and an orientation of the monocular camera 1 and three-dimensional points 104 of the subject 102 of the monocular camera 1 by the monocular SLAM (step S13).

At step S13, the estimation of the location and the orientation of the monocular camera 1 may be an estimation of at least one of the location or the orientation of the monocular camera 1. For example, the result obtained by estimating only the location of the monocular camera 1 may be used.

Accordingly, the estimation device 10 of the first embodiment enables the improvement of the accuracy of estimating motion of the autonomous mobile robot 100 (an example of a moving object) by using the monocular SLAM. Specifically, the estimation device 10 of the first embodiment provides, for example, the following effects (1) to (3).

(1) Effect of Translating Monocular Camera 1 During Pure Rotation

Even in the case of pure rotation at the start of estimating motion, a sufficient baseline can be obtained. Thus, three-dimensional points 104 at the finite depth are obtained. Therefore, the deterioration of the accuracy of motion estimation or the failure of motion estimation can be prevented.

Even in the case in which the pure rotation is continuously performed (for example, a case of continuously rotating by 180 degrees), a sufficient baseline can be obtained. Thus, three-dimensional points 104 at the finite depth are obtained. Therefore, the deterioration of the accuracy of motion estimation or the failure of motion estimation can be prevented.

(2) Effect of Varying Translation Amount According to Distance of Subject 102

In a case in which the amount of translating the monocular camera 1 is small relative to the distance to the subject 102, the accuracy of estimating motion and the accuracy of estimating three-dimensional points may deteriorate. The estimation device 10 of the first embodiment increases the amount of translating the monocular camera 1 (varying the amount of translating the monocular camera 1 depending on the distance to the subject 102) so that the farther the subject 102 is from the monocular camera 1, the larger the baseline, thereby preventing deterioration of the accuracy of motion estimation.

The amount of translating the monocular camera 1 can be reduced as compared to the unconditional, large translation of the monocular camera 1 to accommodate the distant subject 102.

(3) Effect of Detecting Pure Rotation From Variations in Optical Flows

Since the history of motion estimation is not used, whether the monocular camera 1 performs pure rotation can be detected even at the start of motion estimation (there is no history of motion estimation at the start).

Only the monocular camera 1 can detect whether the pure rotation is performed. Even in applications requiring an inertial measurement unit (IMU) or other devices to detect the pure rotation, the product cost can be reduced because it is no longer necessary to install a sensor other than the monocular camera 1.

In the case of the autonomous mobile robot 100, such as a drone, which is expected to be moved for a long period of time, a method of detecting the pure rotation by using the IMU has a problem. Specifically, in a case in which rotational and translational motion are estimated by the IMU, errors are accumulated in the estimation of speed, a problem in which the accuracy of estimating the pure rotation significantly deteriorates occurs. According to the method of detecting the pure rotation by using the estimation device 10 of the first embodiment, such a problem does not occur. A specific example of the accumulation of errors in acceleration will be described. It is assumed that an initial speed is given at a certain time. It is also assumed that a speed is continuously integrated from the acceleration to obtain a speed after a certain time. In a case in which there is an error in the acceleration that can be acquired by the IMU, errors in acceleration will be accumulated in the speed for each time of integration. Therefore, the amount of the errors in the speed increases over time.

Second Embodiment

Next, a second embodiment will be described. In the description of the second embodiment, similar explanations to the first embodiment will not be repeated, and components that differ from the first embodiment will be described.

Example of Functional Configuration

Figure 13:
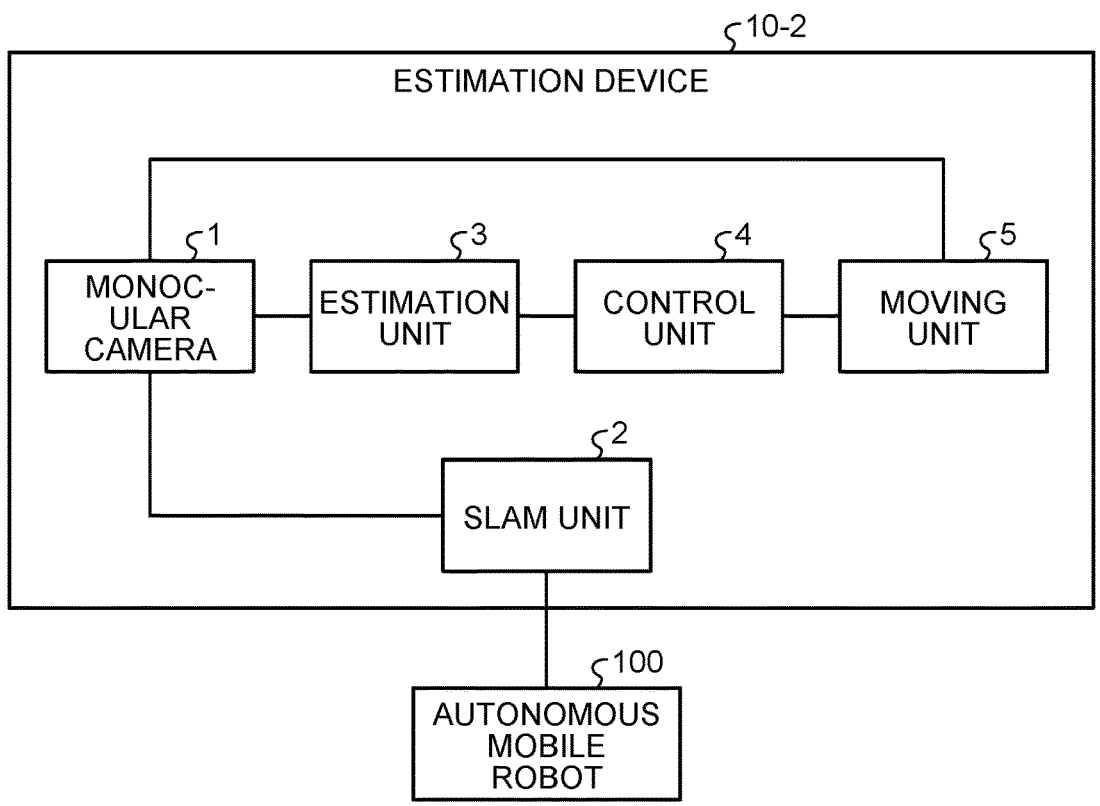
FIG. 13 is a diagram illustrating an example of a functional configuration of the estimation device of the second embodiment.

FIG. 13 is a diagram illustrating an example of a functional configuration of an estimation device 10-2 of the second embodiment. The second embodiment of the estimation device 10-2 includes the monocular camera 1, the SLAM unit 2, the estimation unit 3, the control unit 4, and a moving unit 5. The difference from the configuration of the first embodiment is that the estimation device 10-2 further includes the moving unit 5.

The moving unit 5 changes a location of the monocular camera 1 mounted on the autonomous mobile robot 100 by translating the monocular camera 1 based on the translation amount b (baseline) determined by the control unit 4.

Figure 14:
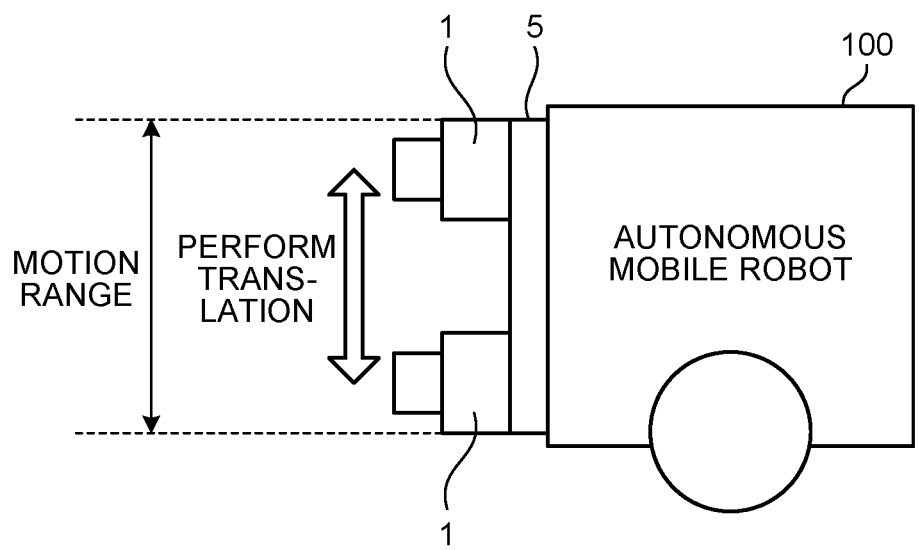
FIG. 14 is a diagram illustrating an example of a moving unit of the second embodiment.

FIG. 14 is a diagram illustrating an example of the moving unit 5 of the second embodiment. The autonomous mobile robot 100 of the second embodiment is, for example, an industrial robot or an automobile. The moving unit 5 translates the monocular camera 1, for example, as illustrated in FIG. 14. In the example in FIG. 14, a motion range of the monocular camera 1 corresponds to the upper limit of the movable range of the first embodiment (Equation (1)). In the example in FIG. 14, a direction along which the monocular camera 1 translates is perpendicular to a direction of an optical axis of the camera. The translation amount b (baseline) is determined by the control unit 4.

As described above, the estimation device 10-2 of the second embodiment further includes the moving unit 5 that translates a location of the monocular camera 1 mounted on a moving object, such as an industrial robot and an automobile, based on the translation amount. In a case of causing the monocular camera 1 to translate, the control unit 4 controls the moving unit 5 to translate the monocular camera 1.

According to the estimation device 10-2 of the second embodiment, the same effect as the estimation device of the first embodiment is obtained.

Finally, examples of a hardware configuration of the estimation device 10 (10-2) according to the first and second embodiments are described. The estimation device 10 (10-2) of the first and second embodiments can be implemented by using, for example, any computer device as underlying hardware.

Example Hardware Configuration

Figure 15:
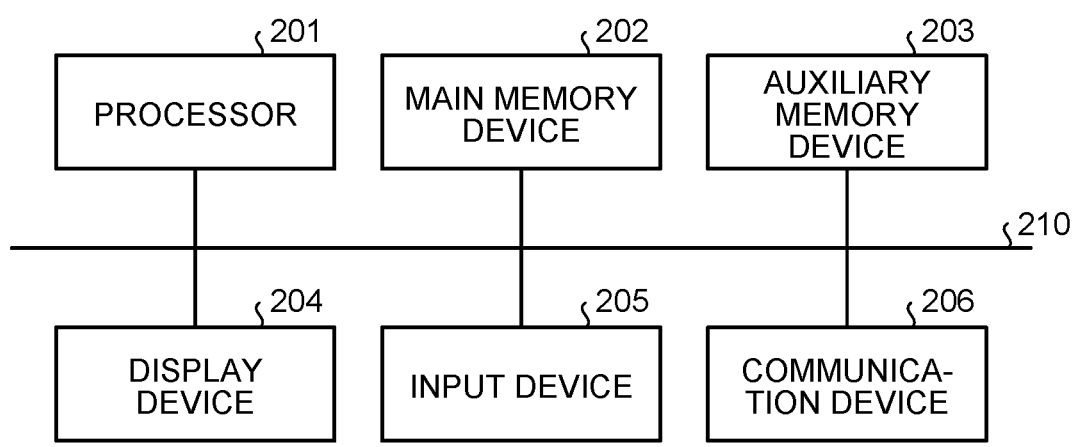
FIG. 15 is a diagram illustrating an example of a hardware configuration of the estimation devices of the first and second embodiments.

FIG. 15 is a diagram illustrating an example of a hardware configuration of the estimation device 10 (10-2) of the first and second embodiments. The estimation device 10 (10-2) in the first and second embodiments is provided with a processor 201, a main memory device 202, an auxiliary memory device 203, a display device 204, an input device 205, and a communication device 206. The processor 201, the main memory device 202, the auxiliary memory device 203, the display device 204, the input device 205, and the communication device 206 are connected to each other via a bus 210.

The estimation device 10 (10-2) may not include some of the above configurations. For example, in a case in which the estimation device 10 (10-2) can use an input function and a display function of an external device, the estimation device 10 (10-2) may not include the display device 204 and the input device 205.

The processor 201 executes a computer program read out from the auxiliary memory device 203 by the main memory device 202. The main memory device 202 is a memory such as ROM and RAM. The auxiliary memory device 203 is a hard disk drive (HDD), a memory card, or the like.

The display device 204 is, for example, a liquid crystal display. The input device 205 is an interface for operating the estimation device 10 (10-2). The display device 204 and the input device 205 may be implemented by a touch panel or the like, which has both a display function and an input function. The communication device 206 is an interface for communicating with other devices.

For example, a computer program executed by the estimation device 10 (10-2) is provided as a computer program product that is formed in an installable or executable format file, and that is recorded in a computer-readable storage medium, such as a memory card, hard disk, CD-RW, CD-ROM, CD-R, DVD-RAM, and DVD-R.

For example, the computer program executed by the estimation device 10 (10-2) may be stored in a computer connected to a network such as the Internet and provided by downloading via the network.

For example, the computer program executed by the estimation device 10 (10-2) may also be provided via a network such as the Internet without being downloaded. Specifically, the estimation processing may be executed through an application service provider (ASP) type cloud service, for example.

For example, the computer program for the estimation device 10 (10-2) may be provided with a ROM or the like in which the computer program is embedded in advance.

The computer program executed by the estimation device 10 (10-2) has a modular structure including functions that can also be implemented by a computer program out of the functional configurations described above. As actual hardware, the processor 201 reads out the computer program from a storage medium and executes each of the functions, thereby loading each of the above-described functional blocks into the main memory device 202. That is, each of the above functional blocks is generated in the main memory device 202.

Some or all of the above-described functions may be implemented by hardware such as integrated circuits (IC) without using software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation device comprising:
one or more hardware processors configured to function as:
an estimation unit that estimates whether motion of a moving object is pure rotation from a plurality of first monocular images acquired by a monocular camera mounted on the moving object;
a control unit that determines a translation amount for translating the monocular camera in a case in which the motion of the moving object is the pure rotation; and
a simultaneous localization and mapping (SLAM) unit that estimates at least one of a location or an orientation of the monocular camera, and three-dimensional points of a subject of the monocular camera by monocular SLAM, from the first monocular images and a second monocular image acquired by the monocular camera that is translated based on the translation amount, wherein
the control unit determines an upper limit of a movable region of the monocular camera at a start of estimating the motion, and determines the translation amount within a range equal to or smaller than the upper limit according to a distance between the monocular camera and the subject during continuous estimation of the motion.

2. The estimation device according to claim 1, wherein in a case of translating the monocular camera, the control unit translates the monocular camera by translating the moving object in a given direction.

3. The estimation device according to claim 2, wherein at the start of estimating the motion, the control unit determines a direction, for which the upper limit is greater, as the given direction based on the upper limit of the movable region of the monocular camera.

4. The estimation device according to claim 1 wherein the one or more hardware processors are configured to further function as:
a moving unit that translates a location of the monocular camera mounted on the moving object based on the translation amount, wherein
the control unit translates the monocular camera by controlling the moving unit in a case of translating the monocular camera.

5. The estimation device according to claim 1, wherein the estimation unit estimates whether the motion is the pure rotation based on variations in lengths of optical flows indicating movements of feature points of the subject.

6. The estimation device according to claim 5, wherein the estimation unit identifies the variations in the lengths of the optical flows by a variance value of the lengths of the optical flows, and estimates that the motion is the pure rotation in a case in which the variance value is smaller than a threshold value.

7. The estimation device according to claim 6, wherein the estimation unit estimates that the motion is translational motion in a case in which the variance value is equal to or greater than the threshold value.

8. An estimation method implemented by a computer, the method comprising:
estimating, by an estimation device, whether motion of a moving object is pure rotation from a plurality of first monocular images acquired by a monocular camera mounted on the moving object;
determining, by the estimation device, a translation amount for translating the monocular camera in a case in which the motion of the moving object is the pure rotation; and
estimating, by the estimation device, at least one of a location or an orientation of the monocular camera, and three-dimensional points of a subject of the monocular camera by monocular simultaneous localization and mapping (SLAM) from the first monocular images and a second monocular image acquired by the monocular camera that is translated based on the translation amount, wherein
the determining comprises:
determining, by the estimation device, an upper limit of a movable region of the monocular camera at a start of estimating the motion; and
determining, by the estimation device, the translation amount within a range equal to or smaller than the upper limit according to a distance between the monocular camera and the subject during continuous estimation of the motion.

9. A computer program product having a non-transitory computer readable medium including programmed instructions stored thereon, wherein the instructions, when executed by a computer, cause the computer to function as:
an estimation unit that estimates whether motion of a moving object is pure rotation from a plurality of first monocular images acquired by a monocular camera mounted on the moving object;
a control unit that determines a translation amount for translating the monocular camera in a case in which the motion of the moving object is the pure rotation; and
a simultaneous localization and mapping (SLAM) unit that estimates at least one of a location or an orientation of the monocular camera, and three-dimensional points of a subject of the monocular camera by monocular SLAM, from the first monocular images and a second monocular image acquired by the monocular camera that is translated based on the translation amount, wherein
the control unit determines an upper limit of a movable region of the monocular camera at a start of estimating the motion, and determines the translation amount within a range equal to or smaller than the upper limit according to a distance between the monocular camera and the subject during continuous estimation of the motion.

* * * * *